US006288014B1

(12) United States Patent
Falcone (10) Patent No.: US 6,288,014 B1
(45) Date of Patent: Sep. 11, 2001

(54) PERFLUOROACRYLATE ESTER POLYMER LUBRICANT FOR AN INFORMATION STORAGE SYSTEM

(75) Inventor: Samuel John Falcone, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/050,646

(22) Filed: Mar. 30, 1998

(51) Int. Cl.[7] .................. C10M 107/28; C10M 107/38; G11B 5/012
(52) U.S. Cl. ................. 508/469; 508/524; 508/588; 360/97.01
(58) Field of Search ................... 508/469, 524, 508/588; 360/97.01

(56) References Cited

U.S. PATENT DOCUMENTS

| 5,066,409 | 11/1991 | Nader . | |
|---|---|---|---|
| 5,099,055 | 3/1992 | Kar et al. | 558/80 |
| 5,118,431 | 6/1992 | Nader . | |
| 5,124,060 | * 6/1992 | Yokouchi et al. | 252/62.51 |
| 5,131,674 | * 7/1992 | Tokui | 280/610 |
| 5,194,652 | 3/1993 | Nader | 558/80 |
| 5,230,964 | 7/1993 | Kar et al. | 428/694 |
| 5,494,596 | * 2/1996 | Law et al. | 242/340 |
| 5,624,713 | * 4/1997 | Ramer | 427/371 |
| 5,677,051 | * 10/1997 | Ueda | 428/336 |

* cited by examiner

*Primary Examiner*—Margaret Medley
*Assistant Examiner*—Cephia D. Toomer
(74) *Attorney, Agent, or Firm*—Thomason, Moser & Patterson LLP (57) ABSTRACT

An information storage system is disclosed. The information storage system includes a rigid information storage medium, at least one read/write head, an actuator, and a lubricant. The read/write head comprises a transducer for information introduction and/or retrieval from the storage medium. The actuator supports at least one read/write head for moving the transducer relative to the storage medium. The lubricant which includes a perfluoroacrylate ester polymer is disposed on the surface of the storage medium.

32 Claims, 5 Drawing Sheets

PERFLUOROACRYLATE ESTER POLYMER LUBRICANT FOR AN INFORMATION STORAGE SYSTEM

FIELD OF THE INVENTION

The field of this invention is lubricants for use in information storage systems. More particularly, the invention pertains to information storage systems employing a lubricant including perflouroacrylate ester polymer and having improved anti-wear properties.

BACKGROUND OF THE INVENTION

In information storage systems, such as disk drives found in personal computers and other data processing devices, a rigid magnetic storage medium is moved relative to a read/write head to provide information introduction to and/or retrieval from the magnetic storage medium. The magnetic storage medium (also referred to as a "disk" or "media") are typically comprised of a rigid substrate, an underlayer, a magnetic layer and a carbon layer atop the magnetic layer. In the design of such devices, it is most desirable from a magnetic standpoint to have the read/write head continually touch the surface of the disk during movement to maximize the signal quality. However, the magnetic benefits of such a design are outweighed by the wear and material interactions caused by such a contact arrangement, and such interactions lead to poor system reliability and performance.

To reduce the wear and material interactions on the surface of the disk, a lubricant is commonly disposed on the surface of the disk. A variety of lubricants are used by the industry. One group of commonly used lubricants are perfluoropolyethers (PFPE). There is a continued interest in the development of improved lubricants. This is particularly the case as storage system designs strive for lower "fly heights". The fly height is known in the art to define a certain minimal distance maintained between the head and the disk during movement. Lower fly heights increase the need for good quality lubricants.

Prior art lubricants have been found to be subject to a number of limitations. For example, lubricants may be insoluble or otherwise incompatible with other fluids such as solvents. Also, known lubricants may not be thermally stable. To increase the life of the lubricant, various additives may be added to the lubricant. For example, anti-wear additives may be added to increase the wear resistance of the lubricating fluid. In this case, the solubility, stability and compatibility of the additive must also be evaluated. Moreover, by-products given off during decomposition of the lubricant and/or additives can be problematic.

Thus, there is interest in the development of improved lubricants and additives that exhibit good lubricating properties including wear resistance, are thermally stable, and soluble or compatible with other fluids.

OBJECTS AND SUMMARY OF THE INVENTION

Accordingly, it is an object of the present invention to provide an information storage system employing a lubricant exhibiting desirable lubricating properties.

Another object of the present invention is to provide a lubricant having improved wear resistance properties.

More particularly, it is an object of the present invention to provide a lubricant including a perflouroacrylate ester polymer on the surface of a disk in an information storage system.

Another object of the present invention is to provide a lubricant composition comprised of a mixture of perfluoropolyether and perflouroacrylate ester polymer.

These and other objects and advantages are achieved by the invention herein where an information storage system comprising a perfluoroacrylate ester polymer lubricant on the surface of a rigid storage medium is provided. In one embodiment of the subject invention, the lubricant includes a perfluoroacrylate ester homopolymer having a repeat unit of the general structure:

where R is a perfluoro alkyl chain, linear or branched and containing 1 to 18 carbon atoms; and X is selected from the group consisting of H, $CH_3$, $CF_3$ or $C(CF_3)_3$.

In an alternative embodiment of the present invention the lubricant includes a perfluoroacrylate ester copolymer having a repeat unit of the structure:

wherein Rf is a perfluoro alkyl chain, linear or branched and containing 1 to 18 carbon atoms; and X is selected from the group consisting of H, $CH_3$, $CF_3$ or $C(CF_3)_3$.

In a further alternative embodiment, the lubricant composition is provided comprising a mixture of perfluoropolyether and perflouroacrylate ester polymer.

BRIEF DESCRIPTION OF THE FIGURES

Additional objects and features of the present invention will become apparent upon reading of the detailed description of the invention and the appended claims provided below, and upon reference to the drawings in which:

DESCRIPTION OF THE SPECIFIC EMBODIMENTS

An information storage system having a lubricant on the surface of a rigid storage medium (or disk) is provided. The lubricant includes a perfluoroacrylate ester polymer. In an alternative embodiment of the invention a lubricant composition is provided comprising a mixture of perfluoropolyether (PFPE) and perfluoroacrylate ester polymer.

In accordance with one embodiment of the present invention, the lubricant includes a perfluoroacrylate ester polymer, including a homopolymer having a general repeat structure of the formula:

wherein R is a moiety selected from the group of F, $CF_3$, and a fully substituted perfluoro alkyl chain. The fully substituted perfluoro alkyl chain may be branched or linear. More specifically, when R is a linear perfluoro alkyl chain, R is selected from the group $(CF_2)_m$—$CF_3$, where m is 1 to 18. In the embodiment where the perfluoro alkyl chain is branched, R is selected from the group comprising $C(CF_3)_3$, $Cp(CF_3)_2$—$C(CF_3)_3$, where p is 1 to 2. X is selected from the group comprising H, $CH_3$, or $CF_3$.

The number of repeat units in the polymer is represented by n. n is selected such that the total molecular weight of the polymer is in the range of approximately 25,000 to 1,000,000 dal, and preferably is in the range of approximately 100,000 to 300,000 dal. Preferably, X is H and R is selected from the group comprised of $(CF_2)_m$—$CF_3$, to give a structure of where m is 1 to 18. Most preferably, X is H and R is $(CF_2)_{16}$—$CF_3$.

In another embodiment of the present invention the lubricant includes a perfluoroacrylate ester copolymer having a general repeat structure of the formula:

wherein Rf is a moiety selected from the group of F, $CF_3$, and a fully substituted perfluoro alkyl chain, and wherein the perfluoro alkyl chain may be branched or linear. When the perfluoro alkyl chain is linear, Rf selected from the group comprising $(CF_2)_m$—$CF_3$, where m is 1 to 18. When the perfluoro alkyl chain is branched, Rf is selected from the group comprising $C(CF_3)_3$, $Cp(CF_3)_2$—$C(CF_3)_3$, where p is 1 to 2, X is selected from the group consisting of H, $CH_3$, $CF_3$ or $C(CF_3)_3$. In the preferred embodiment, Rf is $CH_2$—$(CF_2)_{16}$—$CF_3$, and X is H, to give a structure:

where Rf is $CH_2$—$(CF_2)_{16}$—$CF_3$.

Figure 1A:
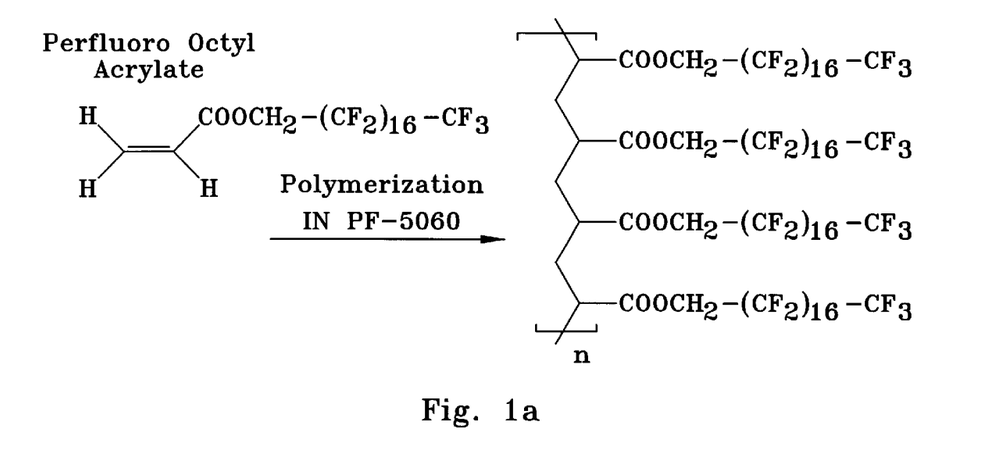
FIGS. 1a and 1b illustrate polymerization reactions to produce perfluoroacrylate ester polymers in accordance with two embodiments of the present invention.

Generally, the perfluoroacrylate ester polymer of the present invention is formed by polymerization of perfluoroacrylate monomers. The perfluoroacrylate ester polymer is formed by conventional chain reaction polymerization, specifically by free radical addition that occurs at the carbon double bonds. In an exemplary embodiment, the perfluoroacrylate ester polymer may be formed by the reactions shown in FIGS. 1a and 1b. In FIG. 1a a perfluoro octyl acrylate monomer is subjected to conditions of polymerization to form a perfluoroacrylate ester homopolymer. The perfluoroacrylate ester polymer shown in FIG. 1a is marketed and sold under the trade name NYEBAR K.

Figure 1B:
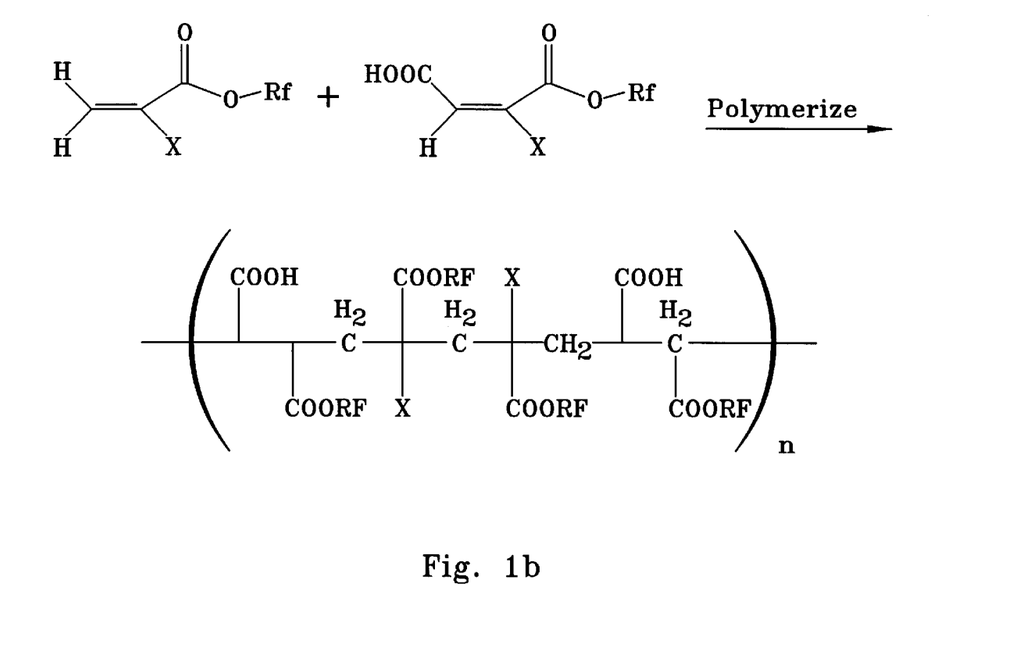

In an alternative embodiment, a perfluoroacrylate ester copolymer is prepared by polymerization of two monomers as shown in FIG. 1b. In this exemplary embodiment, a perfluoroacrylate monomer is polymerized with maleic acid or maleic ester structures to form a perfluoroacrylate ester copolymer. Other compounds finding use as suitable co-monomers include styrene and acrylonitrile, e.g, ones which polymerize with perfluoroacrylate monomers.

The lubricant of the present invention comprising a perfluoroacrylate ester polymer will generally be provided in solution with a solvent. The term "solvent" means a solvent in which the perfluoroacrylate ester polymer is soluble, such as fluorinated organic solvents. Preferably the solvent is PF-5060. The concentration of the polymer in the solvent will be in the range of approximately 0.1 to 2.0 wt % polymer, and preferably in the range of 0.2 to 1.0 wt % polymer.

As described above, the perfluoroacrylate ester polymer of the present invention may be used as a lubricant alone, however when the perfluoroacrylate ester polymer is used as a lubricant alone, the polymer lubricant will typically be present in a solvent since the solvent acts as a means for applying the polymer lubricant to the surface of the disk. Alternatively, the perfluoroacrylate ester polymer of the present invention is suitable as an additive to another lubricant thereby providing a lubricant composition for use in a storage system. In the lubricant composition embodiment, the perfluoroacrylate ester polymer provides anti-wear properties that enhance the wear resistance of the lubricant fluid. Suitable lubricant fluids which may be used with the perfluoroacrylate ester polymer of the present invention include perfluoro-polyethers (PFPE) known in the art such as Ausimont, Z lubes, Ausimont Y lubes, Demnums, and Krytox lubricants.

To provide a lubricant composition with desirable wear resistance properties, the perfluoroacrylate ester polymer is added to a conventional lubricant known in the art. Generally, the lubricant composition will be prepared with a concentration ratio of perfluoroacrylate ester polymer to lubricant in a range of approximately 500/1 to 1/1 wt %/wt % of perfluoroacrylate ester polymer to lubricant, more preferably in the range of 300:1 to 1:1 and most preferably in the range of 25:1 to 5:1 wt %/wt % of perfluoroacrylate ester polymer to lubricant. In the preferred embodiment, NYEBAR K is used as the perfluoroacrylate ester polymer and is added to a PF-5060 solution of Zdol lubricant to form the lubricant composition. NYEBAR K is sold as a solution in a solvent such as PF-5060, at a concentration in the range of 0.1 to 2.0 wt % of NYEBAR K in the solvent. The lubricant composition is prepared by adding an appropriate amount of NYEBAR K solution to the PF-5060 lubricant. The concentration ratio of NYEBAR K solution to lubricant is in a concentration range of 500/1 to 1/1 wt %/wt % of NYEBAR K to lubricant, more preferably in the range of 300:1 to 1:1 and most preferably in the range of 25:1 to 5:1 wt %/wt % of NYEBAR K to lubricant. In an alternative embodiment, NYEBAR K is used as the perfluoroacrylate ester polymer and is added to an AM 2001 lubricant to form the lubricant composition. In this case, the concentrations are the same, that is concentration ratio of NYEBAR K solution to lubricant is in a concentration range of 500/1 to 1/1 wt %/wt % of NYEBAR K to lubricant, more preferably in the range of 300:1 to 1:1 and most preferably in the range of 25:1 to 5:1 wt %/wt % of NYEBAR K to lubricant.

Figure 2:
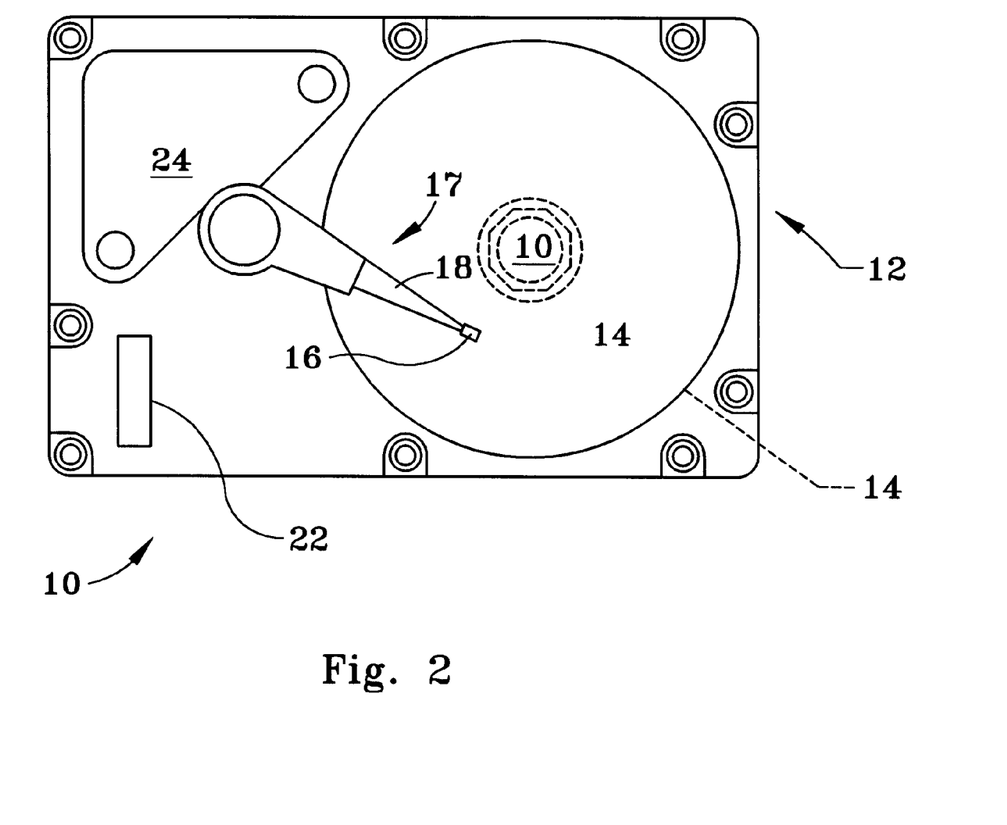
FIG. 2 shows a disk in an information storage system having a lubricant on the surface of the disk in accordance with the present invention.

The lubricant and lubricant composition of the present invention are disposed on the surface of a disk in an information storage system. The information storage system will comprise at least a head-disk assembly and control electronics which may be employed with a computer, printer or fax machine or other host system. Many different information storage system configurations are known in the art, including those described in U.S. Pat. Nos. 5,097,368; 5,193,046; and 5,317,463. A simplified drawing of an exemplary information storage system is shown in FIG. 2. As shown in FIG. 2 the information storage system 10 includes a sealed housing 12, a rigid magnetic storage medium 14 which is usually in the form of a disk, a read/write head 16, and an actuator assembly 17 having an actuator arm 18 for positioning the read/write head 16 disposed at the end of the actuator arm 18 over the surface of the storage medium 14. Multiple read/write heads may be employed although not shown in the plan view. The read/write head 16 carries a read/write element (not shown), and the element can be any type known in the art, such as inductive thin film, MIG or MR. A spindle motor 20 is provided which mounts the disk or disks 14 and spins them at a constant speed. A header assembly 22 is provided for transferring electronic signals to and from a motor 24 which positions the actuator and the read/write head 16 as data is transferred to and from the disk 14.

Generally, the surface of the disk 14 will be textured. The entire surface of the disk may be textured to minimize stiction, friction, and wear during start-stop cycles. Alternatively, separate textured data and landing zones may be provided on the surface of the disk. The lubricant disposed on the surface of the disk 14 and acts to minimize wear, friction and stiction between the disk and the read/write head as the read/write head passes over the disk. Of particular advantage, the perfluoroacrylate ester polymer of the present invention provides an improved lubricant and enhances the wear resistance of the lubricant. The perfluoroacrylate ester polymer is disposed on the surface of the disk 14 by means such as dip coating or spin-on coating. To provide desirable lubricating properties, the thickness of the perfluoroacrylate ester polymer disposed on the surface of the disk is in the range of 50 Å to 5 Å, and preferably is in the range of 25 Å to 10Å.

The perfluoroacrylate ester polymer is thermally stable and the lubricating properties of the perfluoroacrylate ester polymer are useful over the temperature range of operation of the information storage system, i.e. from approximately 10° C. to 80 ° C.

Experimental

The following tests demonstrate the capabilities of the present invention and such examples are offered by way of illustration and not by way of limitation.

Contact Start-Stop Tests

Contact start-stop (CSS) tests were performed in a conventional spin stand. The disks contain lubricants disposed thereon of varying concentration in accordance with the present invention. Two types of disks were tested using the lubricant of the present invention. The disks tested were Proximity recording media disks, as known in the art were tested. The disks are a mechanical full surface texture disk having a $C/N_2$ carbon surface. Also, laser zone texture media disks with landing zone bump heights of approximately 165 Å and a $C/H_2$ carbon surface were tested.

Figure 3:
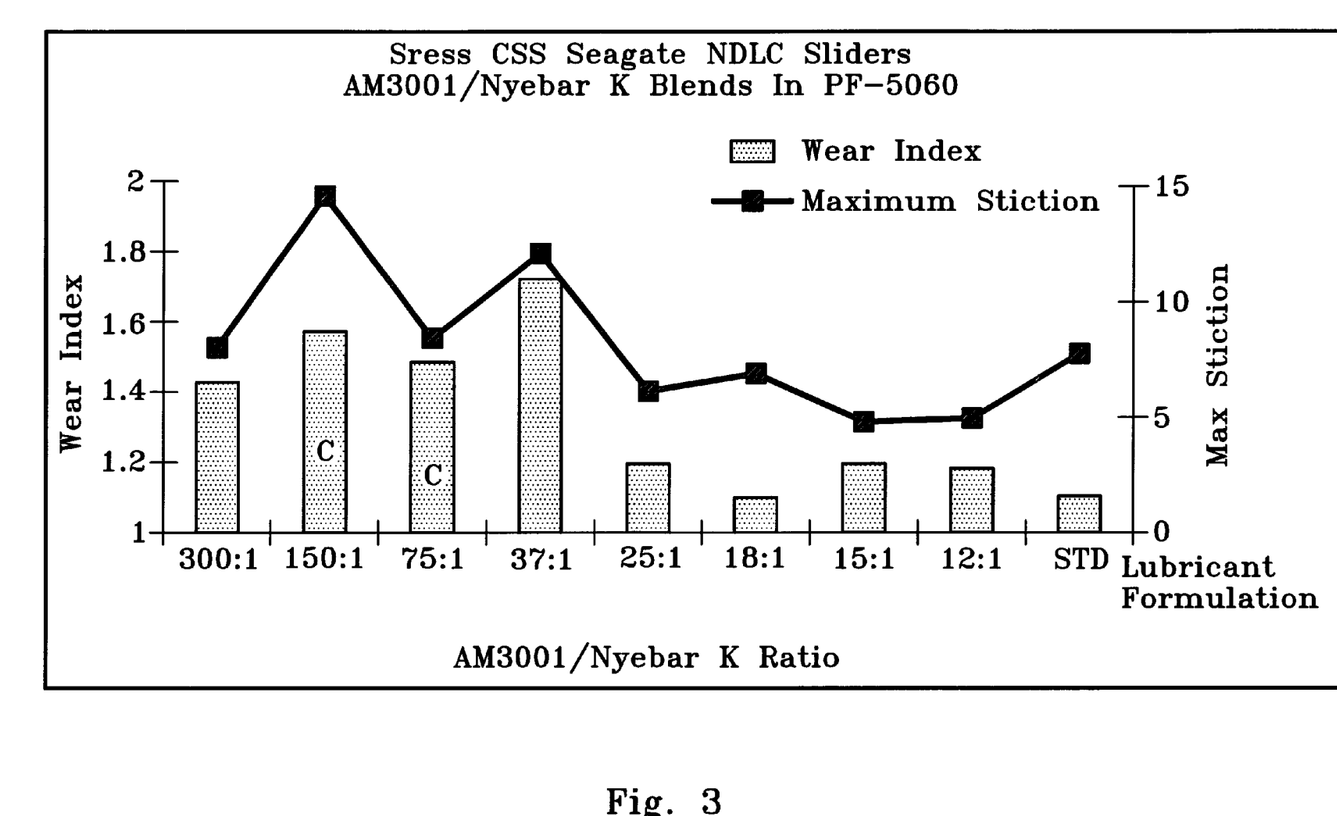
FIG. 3 is a graph showing wear index and maximum stiction for proximity recording media disks tested containing lubricants of varying concentrations in accordance with the present invention.
Figure 4:
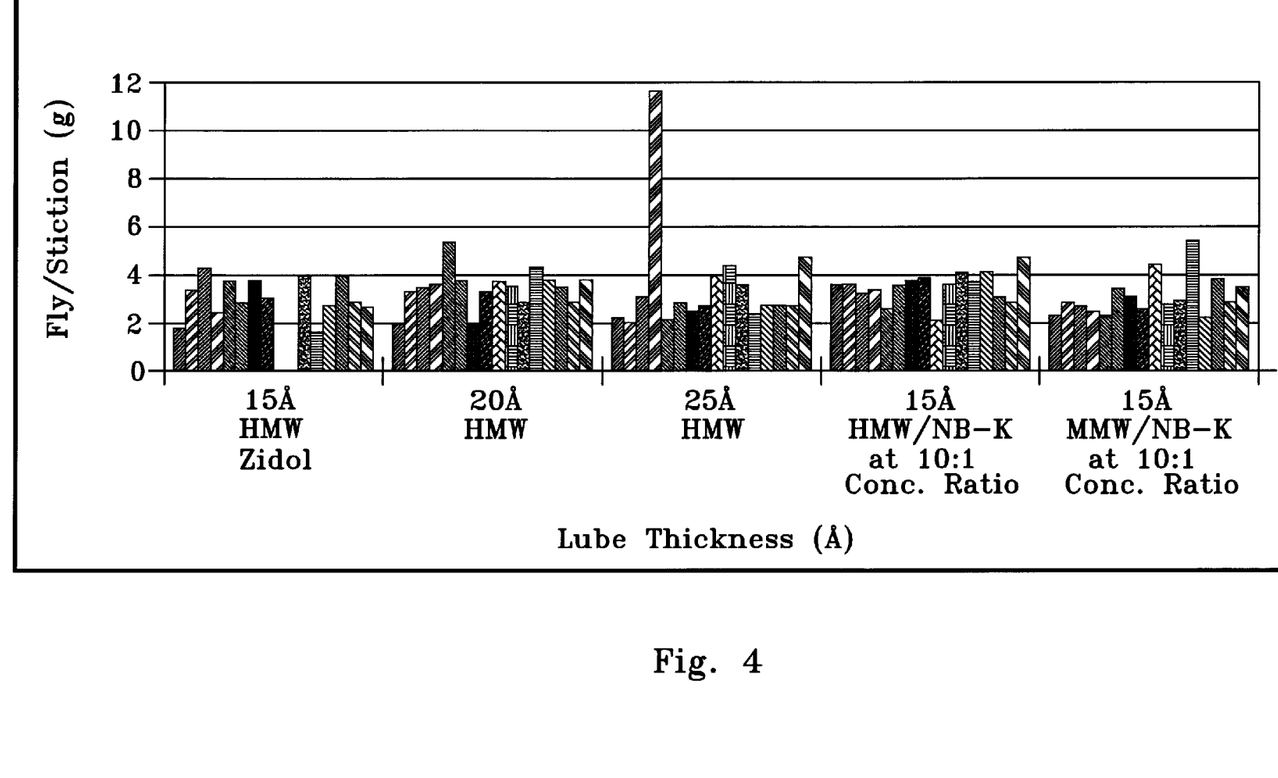
FIG. 4 shows fly/stiction data for laser zone texture disks tested with a conventional lubricant and with the lubricant composition of the present invention.

The average wear index and maximum stiction for the proximity recording media disks are shown in FIG. 3. The wear index and maximum stiction are plotted as a function of the lubricant composition polymer to solvent wt % ratio. FIG. 4 shows fly/stiction data for laser zone texture disks tested with a conventional lubricant and with the lubricant composition of the present invention. Specifically, three sets of disks were tested using a conventional lubricant (a high molecular weight (HMW) ZIDOL lubricant), and being disposed on the surface of the disks at 15 Å, 20 Å and 25 Å thicknesses. Two sets of disks containing two different compositions of the lubricant of the present invention were tested. The first set containing a lubricant composition composed of HMW ZIDOL and NYEBAR K in a concentration ratio of 10:1; and the second set containing a lubricant composition composed of medium molecular weight (MMW) ZIDOL and NYEBAR K in a concentration ratio of 10:1. Both of these lubricant compositions of the present invention were applied to the disks at a thickness of 15 Å.

Figure 5:
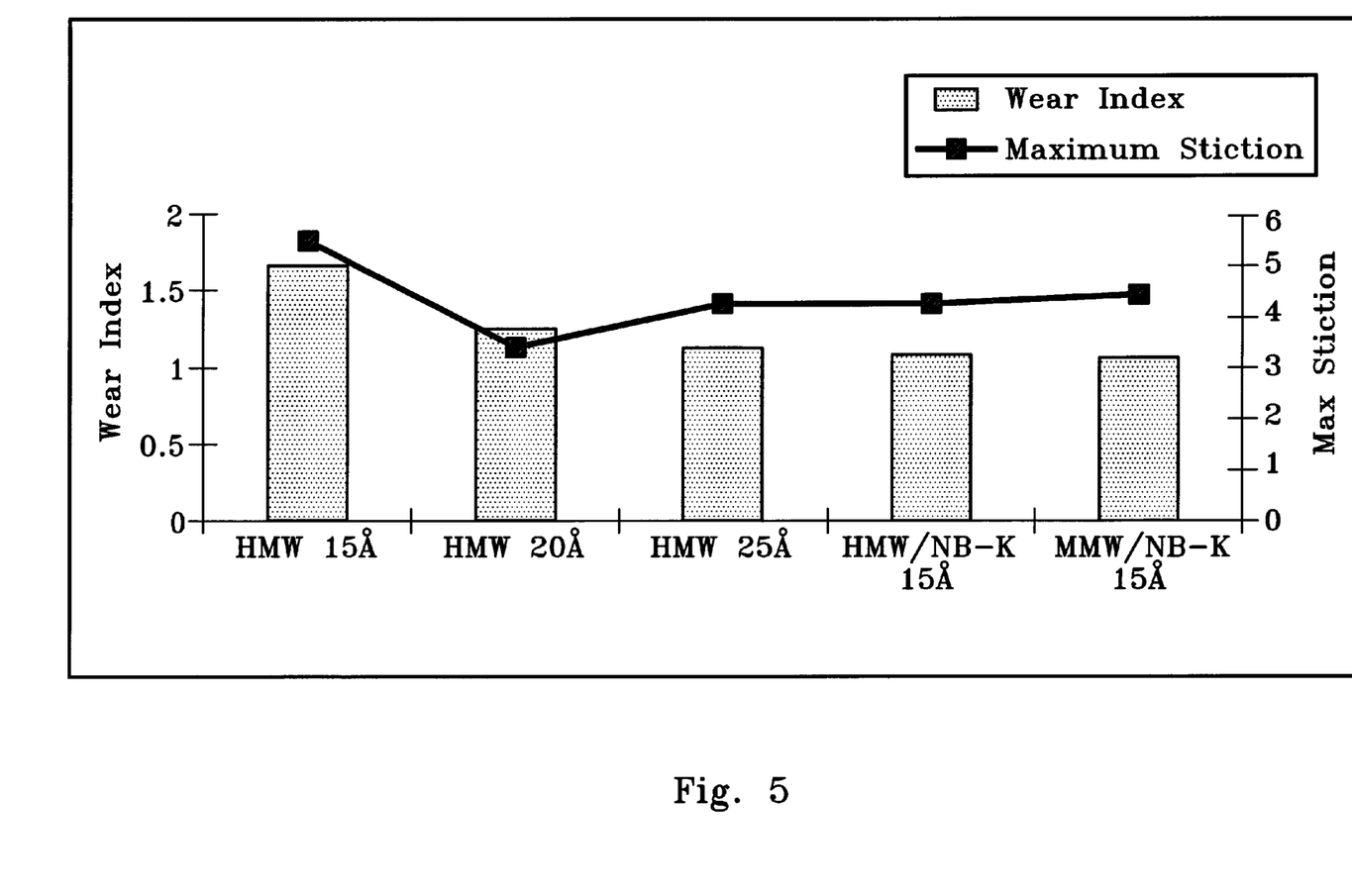
FIG. 5 depicts the average stiction data of FIG. 4 as well as the wear index for laser zone texture disks tested with a conventional lubricant and with the lubricant composition of the present invention.

FIG. 5 plots the average maximum stiction for the data depicted in FIG. 4, as well as the average wear index for these disks. As shown, the addition of the perfluoroacrylate ester polymer of the present invention lowers the wear index and reduces the maximum stiction. Of particular advantage, when we look at the same lubricant thickness and compare the performance of the lubricants, for example at 15 Å, we see that the lubricant of the present invention improves the wear index without hindering the stiction performance. Moreover, the index and maximum stiction are significantly reduced when the concentration ratio of polymer to solvent in wt % is in the range of approximately 25:1 to 12:1. Thus, the lubricant of the present invention is suitable as an anti-wear additive and is shown to exhibit desirable wear resistance properties. Moreover, the perfluoroacrylate ester polymer of the present invention is compatible with commonly used solvents thereby providing for versatility and ease of use, as well as exhibiting thermal stability.

It is evident from the above results and discussion that information storage systems having improved lubricants are provided. The lubricants comprising a perfluoroacrylate ester polymer provide a low wear index and exhibit low stiction, and are compatible with conventional solvents and other lubricating fluids while remaining thermally stable over operating temperature ranges.

The invention now being filly described, it will be apparent to one of ordinary skill in the art that many changes and modifications can be made thereto without departing from the spirit or scope of the appended claims.

What is claimed is:

1. An information storage system comprising:
    a rigid information storage medium;
    at least one read/write head comprising a transducer for information introduction and/or retrieval from said medium;
    an actuator supporting said at least one read/write head for moving said transducer relative to said storage medium; and a lubricant disposed on the surface of said storage medium, wherein said lubricant includes a perfluoroacrylate ester polymer.

2. The storage system of claim 1 wherein said perfluoroacrylate ester polymer is carried in a solvent solution.

3. The storage system of claim 1 wherein said lubricant further comprises a lubricant composition of a mixture of said perfluoroacrylate ester polymer and perfluoro-polyether (PFPE).

4. The storage system of claim 1 wherein said perfluoroacrylate ester polymer is a homopolymer and has a repeat unit of the structure:

wherein R is a moiety selected from the group consisting of F, $CF_3$, and perfluoroalkyl chains having 1 to 18 carbon atoms and where said perfluoroalkyl chains may be branched or linear, and X is selected from the group consisting of H, $CH_3$ and $CF_3$.

5. The storage system of claim 4 wherein the perfluoroalkyl chain is selected from the group consisting of $(CF_2)_m$—$CF_3$, $C(CF_3)_3$, and $C_p(CF_3)_2$—$C(CF_3)_3$, and where m is 1 to 18, and p is 1 to 2.

6. The storage system of claim 1 wherein said perfluoroacrylate ester polymer is a homopolymer.

7. The storage system of claim 1 wherein said perfluoroacrylate ester polymer is a copolymer.

8. The storage system of claim 1 wherein said perfluoroacrylate ester polymer is a copolymer having a repeat unit of the structure:

wherein Rf is a moiety selected from the group consisting of F, $CF_3$, and a perfluoroalkyl chain having 1 to 18 carbon atoms, where said perfluoroalkyl chain may be linear or branched, and X is selected from the group consisting of H, $CH_3$, $CF_3$ and $C(CF_3)_3$.

9. The storage system of claim 8 wherein the perfluoroalkyl chain is selected from the group consisting of $(CF_2)_m$—$CF_3$, $C(CF_3)_3$, and $C_p(CF_3)_2$—$C(CF_3)_3$ and where m is 1 to 18 and p is 1 to 2.

10. The storage system of claim 1 wherein the perfluoroacrylate ester polymer has a molecular weight in the range of approximately 25,000 to 1,000,000 dal.

11. The storage system of claim 1 wherein the perfluoroacrylate ester polymer has a molecular weight in the range of approximately 100,000 to 300,000 dal.

12. The storage system of claim 3 wherein said lubricant composition has a concentration ratio in the range of approximately 500:1 to 1:1 weight % perfluoroacrylate ester polymer to perfluoropolyether (PFPE).

13. The storage system of claim 3 wherein said lubricant composition has a concentration ratio in the range of approximately 25:1 to 5:1 weight % perfluoroacrylate ester polymer to PFPE.

14. The storage system of claim 2 wherein the concentration of the perfluoroacrylate ester in said solvent solution is in the range of approximately 0.1 to 2.0 weight percent.

15. The storage system of claim 1 wherein said perfluoroacrylate ester polymer has a repeat unit of the structure:

16. The storage system of claim 3 wherein said perfluoroacrylate ester polymer has a repeat unit of the structure:

and said lubricant composition has a concentration ratio in the range of approximately 500:1 to 1:1 weight % perfluoroacrylate ester polymer to PFPE.

17. A disk for use in an information storage system characterized in that a lubricant including a perfluoroacrylate ester polymer is disposed on the surface of said disk.

18. The disk of claim 17 wherein said lubricant is comprised of a lubricant composition having a mixture of PFPE and perfluoroacrylate ester polymer.

19. The disk of claim 17 wherein the perfluoroacrylate ester polymer has molecular weight in the range of approximately 25,000 to 1,000,000 dal.

20. The disk of claim 17 wherein the perfluoroacrylate ester polymer has molecular weight in the range of approximately 100,000 to 300,000 dal.

21. The disk of claim 18 wherein said lubricant composition has a concentration ratio in the range of approximately 500:1 to 1:1 weight % perfluoroacrylate ester polymer to PFPE.

22. The disk of claim 18 wherein said lubricant composition has a concentration ratio in the range of approximately 25:1 to 5:1 weight % perfluoroacrylate ester polymer to PFPE.

23. The disk of claim 17 wherein said perfluoroacrylate ester polymer is carried in a solvent solution, and the concentration of the perfluoroacrylate ester polymer in said solvent solution is in the range of approximately 0.1 to 2.0 weight percent.

24. The disk of claim 17 wherein said perfluoroacrylate ester polymer is a homopolymer and has a repeat unit of the structure:

wherein R is a moiety selected from the group consisting of F, CF3 and perfluoroalkyl chains having 1 to 18 carbon atoms, where said perfluoroalkyl chains may be branched or linear, and X is selected from the group consisting of H, CH$_3$, and CF$_3$.

25. The disk of claim 24 wherein said perfluoroalkyl chain is selected from the group of (CF$_2$)$_m$—CF$_3$, C(CF$_3$)$_3$, and C$_p$(CF$_3$)$_2$—C(CF$_3$)$_3$, and where m is 1 to 18, and p is 1 to 2.

26. The disk of claim 17 wherein said perfluoroacrylate ester polymer is a homopolymer.

27. The disk of claim 17 wherein said perfluoroacrylate ester polymer is a copolymer.

28. The disk of claim 17 wherein said perfluoroacrylate ester polymer is a copolymer having a repeat unit of the structure:

wherein Rf is selected from the group consisting of F, CF$_3$ and a perfluoroalkyl chain having 1 to 18 carbon atoms, and where the perfluoroalkyl chain may be branched or linear, and X is selected from the group consisting of H, CH$_3$, CF$_3$ and C(CF$_3$)$_3$.

29. The disk of claim 28 wherein the perfluoroalkyl chain is selected form the group consisting of (CF$_2$)$_m$—CF$_3$, C(CF$_3$)$_3$, and C$_p$(CF$_3$)$_2$—C(CF$_3$)$_3$ and where m is 1 to 18, and p is 1 to 2 and X is H, CH$_3$, CF$_3$ or C(CF$_3$)$_3$.

30. An information storage system comprising:
a rigid information storage medium;
at least one read/write head comprising a transducer for information introduction and/or retrieval from said medium;
an actuator supporting said at least one read/write head for moving said transducer relative to said storage medium; and
lubricating means for lubricating the surface of said storage medium, wherein said lubricating means includes a perfluoroacrylate ester polymer.

31. The storage system of claim 30 wherein said perfluoroacrylate ester polymer is a homopolymer having a repeat unit of the structure:

wherein R is a moiety selected from the group consisting of F, CF$_3$, and perfluoroalkyl chains having 1 to 18 carbon atoms, and where said perfluoroalkyl chains may be branched or linear, and X is selected from the group consisting of H, CH$_3$, CF$_3$ and C(CF$_3$)$_3$.

32. The storage system of claim 30 wherein said perfluoroacrylate ester polymer is a copolymer having a repeat unit of the structure:

wherein Rf is a moiety selected from the group consisting of F, CF$_3$ and perfluoroalkyl chain having 1 to 18 carbon atoms, and where said perfluoroalkyl chain may be branched or linear, and X is selected from the group consisting of H, CH$_3$, CF$_3$ and C(CF$_3$)$_3$.

* * * * *